United States Patent Office 2,713,229
Patented July 19, 1955

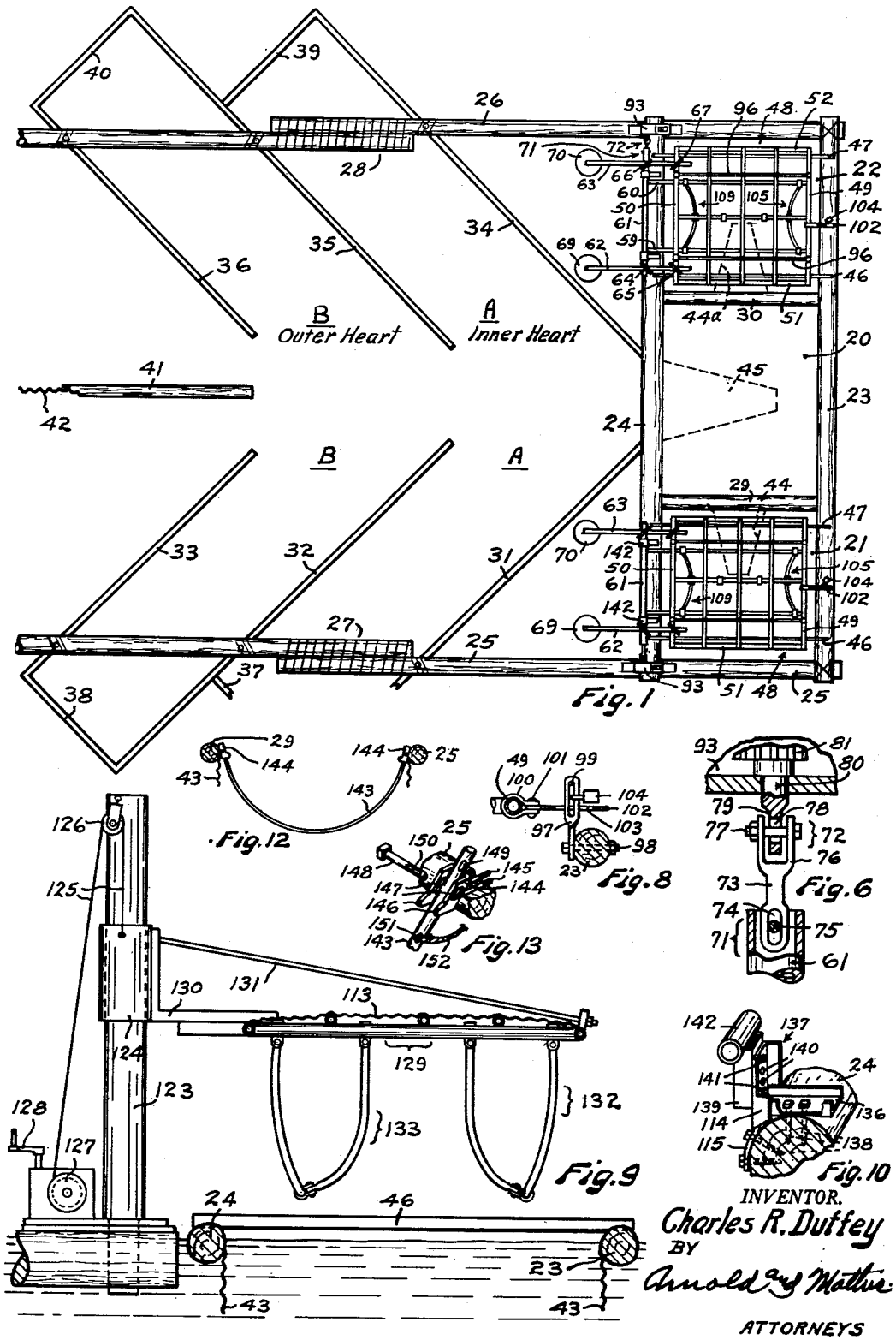

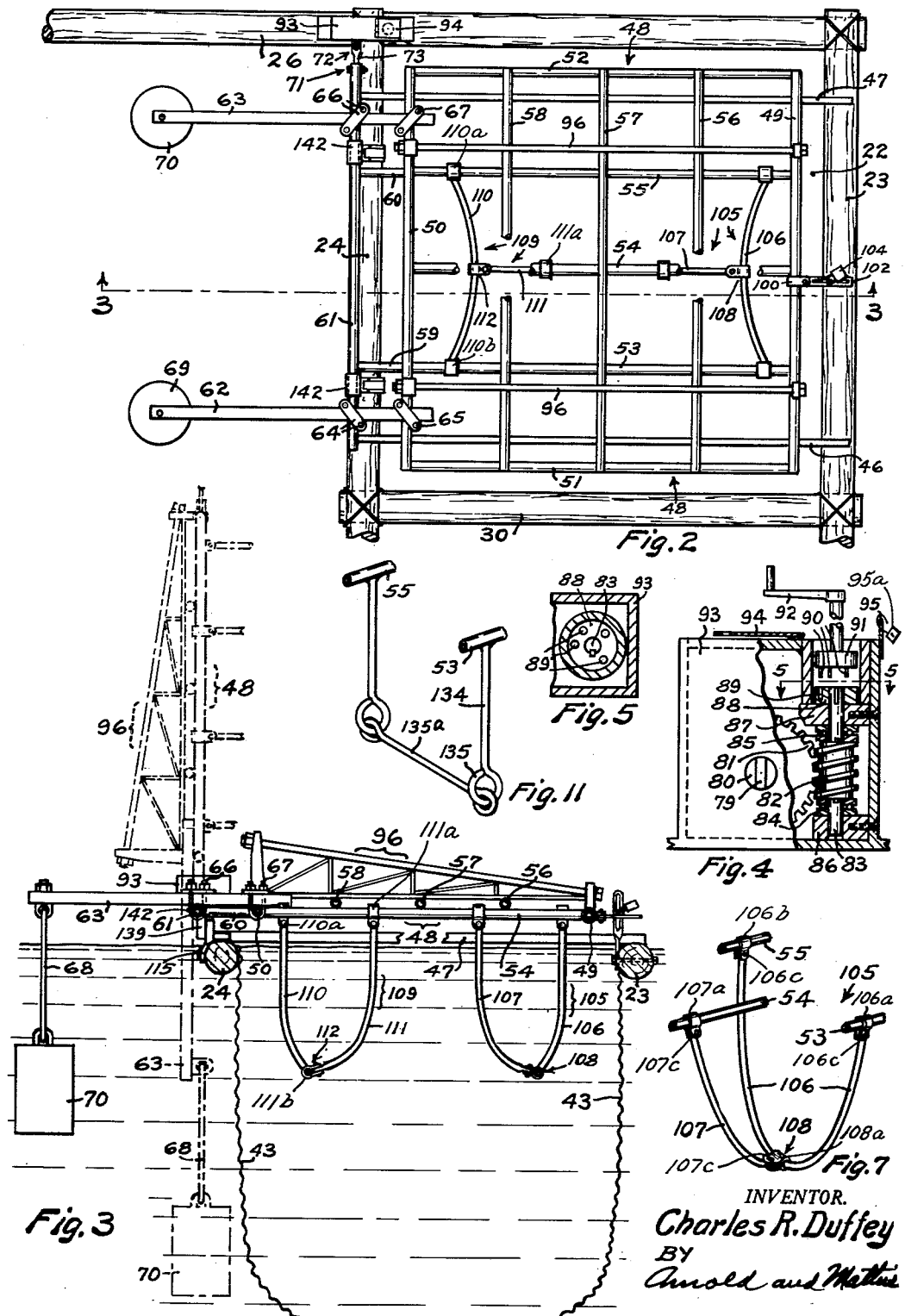

2,713,229

METHOD FOR PREVENTING THE ROBBING OF FISH TRAPS AND ANTI-THEFT FISH TRAP MECHANISM TO CARRY OUT THE SAME

Charles R. Duffey, Seattle, Wash.

Application January 29, 1949, Serial No. 73,486

8 Claims. (Cl. 43—103)

My invention relates to a method of preventing the robbing of fish traps and anti-theft fish trap mechanism to carry out the same. More particularly my invention relates to a method of blocking fish trap pirates in the removal of fish from the trap by preventing the confining of the fish within the impounding net of the trap, the same being a necessary preparatory step for removal of the fish either by brailing or netting, and a mechanism therefor to carry out said method.

For purposes of definiteness and clearness of description and illustration, my invention will be set forth as the same applies to the conditions and problems of catching of salmon by fish traps as practised in the waters of the Pacific Northwest and Alaska. The fish traps particularly in Alaska are often located in isolated places so that fish piracy, that is the robbing of fish traps, is the cause of great loss to the legal owners of the traps. While watchmen are placed on these traps and live there in a small building constructed on the floating logs forming the fish trap impounding supporting frame, unfortunately the watchmen often conspire with the fish trap pirates in robbing the traps. The extreme isolation of the trap sites, stormy or foggy weather, operations under cover of darkness, and breaking of equipment by action of the sea, all combine to render detection extremely difficult. Accordingly, fish of many thousands of dollars value are stolen annually from the fish traps of a single cannery. It will be understood that the run of the fish occurs with considerable uncertainty and the run of the fish past a given trap site is likewise uncertain so that the watchmen may plausibly claim that the fish had not come to that area or trap as an excuse for the trap not being ready to be emptied by the legal owner.

An object of my invention is to provide a method which will hinder the removal of fish from the traps except by the authorized trap tender crew of the owner-cannery so that if the watchmen do prove unfaithful and pirates do remove fish from the trap, there will necessarily be a breaking of equipment of a character which will provide unmistakable proof of such breaking being of unauthorized human agency.

It will be understood that the fish trap impounding frame which supports the impounding net is floatingly secured so that it can rise or fall with the tide and that it is subject to constant weaving due to the waves and often to heavy seas which wash over the supporting frame. The logs constituting such trap frame are of very large size, often six or more feet in diameter by one hundred and twenty feet long, ordinarily enclosing two trap spiller areas thirty feet square and a fish pot of about thirty feet by forty feet. The impounding net may extend down some twenty feet below the water surface. Moreover, it will be understood that the fish pirates must work with great haste as they do not know when they may be observed by witnesses, and there is at most only about two hours of darkness at night at the latitudes in question. Accordingly, the method and mechanism embodying my invention takes this into account.

As appears from the trap construction set forth above, fish, while impounded in the spillers, are free to swim throughout a considerable area and volume of water, and in order for them to be removed, it is positively necessary to further confine the fish as a first and preliminary step.

One of the primary objects and purposes of my invention is to provide a cover for the spiller opening of the salmon trap of a character which provides a convenient readily and rapidly operated device so far as the true owner is concerned, and at the same time, to provide unmistakable evidence that the trap has been molested by human agents if in fact and truth there has been improper removal of the fish from the trap. Being subject to the action of the constant minute by minute weaving and tensioning of the various parts due to the action of the sea, mechanism can be broken or torn from their proper functioning and consequently evidence of the same fails in convincingly establishing unfaithfulness of the watchman or piracy on the part of suspected parties. Accordingly, it is the primary purpose of my invention to so construct the spiller cover that any unauthorized tampering therewith by human agents will provide positive and convincing evidence that the trap has been molested. Any such positive evidence of molestation will place the burden upon the watchman to explain. My purpose is to provide mechanism which will protect both against the watchman, fish pirates and all unauthorized removal of fish from the traps, at least to the extent that the use of said mechanism will make it exceedingly difficult for any such unauthorized removal to take place without leaving convicting evidence.

The method of my invention provides for preventing the robbing of the trap by making it impossible or very difficult for the pirates to confine the fish within the impounding netting.

There are two types of impounding nets—one construction of hemp, and one of wire. In removing the fish, the practice is to manually raise the bottom of the hemp impounding net by pulling up on the sides to confine the fish for the brailing operation. In this case, my invention blocks or prevents such confining by limiting the height to which the bottom can be raised. In the case of the wire impounding net, the bottom is not raised, and my invention prevents the successful operation of the device, commonly known as a "Swift Water" (hereinafter described), by the pirates by preventing the necessary confining of the fish to permit the operation of the dip net.

Stated broadly and generally but briefly and therefore incompletely, the invention for preventing the robbing of fish traps involves the method of maintaining the impounded fish in a depth of water in the trap wherein they can swim freely and while thus unconfined, they are not subject to unauthorized removal. Also, the invention provides (in its preferred form) a removable spiller cover having depending arms projecting into the spiller a sufficient distance to insure the fish an unconfined swimming depth of water even though the bottom of the netting of the spiller is raised. Any such raising of the netting will be blocked by said depending arms. Furthermore, the invention involves means for readily removing such cover and its depending projecting arms when the agent of the true owner of the trap arrives for removal of the fish from the trap. One form of the invention (not the preferred form) may involve a metallic covering for the spiller, which covering may or may not have said projecting arms for obstructing the raising of the net forming the spiller. Such covering along with the locking features prevent access to the spiller for the unauthorized removal of the fish.

A condition complicating the providing of a protective spiller cover, which is of an anti-theft character, is the fact that regard must be had to having the cover of a character that it will not operate contrary to the instincts of the fish, which would occur if too much cover is constructed and thereby provide a dark object above, as this will result in the fish not entering that spiller.

The above mentioned general objects of my invention, together with others inherent in the same, are attained by the mechanism illustrated in the following drawings, throughout which drawings like reference numerals indicate like parts:

Figure 1 is a plan view of a salmon floating trap showing the fish pot and the spillers on each side thereof provided with the anti-theft fish trap mechanism of my invention;

Fig. 2 is a plan view of a spiller provided with the anti-theft fish trap mechanism embodying my invention;

Fig. 3 is a view in cross-section on dotted line 3—3 of Fig. 2;

Fig. 4 is a view of the gear, worm and crank mechanism for elevating the spiller covering frame of my invention;

Fig. 5 is a cross sectional view on broken line 5—5 of Fig. 4;

Fig. 6 is a view partially in section of the flexible joint means forming part of the elevating shaft means;

Fig. 7 is a view in perspective of the bracket projecting mechanism;

Fig. 8 is a view in perspective of the frame weaving absorbing locking mechanism;

Fig. 9 is a view in elevation with parts in section of a modified form of my invention having a spar and spiller cover elevating means whereby the same may be elevated and swung out of position;

Fig. 10 is a view in perspective of a detail of the mounting of the shaft on the supporting rear frame member;

Fig. 11 is a view of a modified form of the projecting bracket member;

Fig. 12 is a modified form of a projecting means; and

Fig. 13 is a fragmentary exploded view of the mounting means of the modified form shown in Fig. 12.

The ordinary salmon fish trap may be formed as follows:

A fish pot 20 has spillers 21 and 22 disposed on each side thereof—see Fig. 1. These parts are formed by means of an outer or front log 23, an inner or back log 24, and side logs 25 and 26. The front log ordinarily is a single log some six feet or more in diameter and about one hundred and twenty feet long. The fish pot inside measurement is about forty feet long by thirty feet wide and the spillers are about thirty feet square. The side logs 25 and 26 may be formed by splicing or overlapping as indicated at 27 and 28. Intermediate logs 29 and 30 complete the framework of each spiller. The frame members 31, 32, 33, 34, 35 and 36 form the main members for supporting the end members 37 and 38, 39 and 40 of the inner heart A and the outer heart B, respectively, of the trap. The lead log 41 supports the lead net 42 which extends towards the shore. It will be understood that the trap structure hereinabove described constitutes ordinarily a floating trap platform rising and falling with the tide and with the swells of the sea. The log members 23 and 24 and the parts therebetween are morticed and bolted and cabled together to permit of weaving of the structure, such frame being ordinarily subjected to almost constant weaving action.

An impounding net 43 is supported by the front log 23, back log 24, and an end portion of log 25 and intermediate log 29 to constitute spiller 21. This net is one continuous bag-like structure having only a top opening and a side opening in which converging tunnel 44 is inserted. The second spiller 22 is of similar construction to spiller 21. The fish pot 20 is formed of wire netting of a bag form, the upper periphery of which is supported by members 23, 24, 29 and 30. This is open only at the top and at the sides and connected with the tunnel structures 44 and 44a, each of the same being a converging structure to lead the fish into the spillers. Also the fish pot 20 has its wire netting provided with an opening for the tunnel 45 which conducts the fish from the inner heart A into the fish pot 20 proper.

Since the spillers 21 and 22 are of the same construction, see Figs. 1 and 3, only the construction of spiller 21 will be herein described in detail. In one type of fish trap, the impounding net 43 is formed of manila rope netting, and, in the second type, it is formed of wire netting. The practice is to raise the bottom of the manila netting in removing the impounded fish, while in the case of the wire netting no such raising is done, but the fish are removed as follows: A "Swift Water" device, hereinafter described, is employed to confine the fish as is similarly accomplished by lifting the spiller as in the case of manila netting. The "Swift Water" is a sheet netting of greater length and width than the brailer. After the fish are confined by the operation of the "Swift Water," the brailer is used to remove the fish in the same manner as when confined in the hemp or manilla spiller.

Extending across the spiller 21 opening are timbers 46 and 47, see Fig. 2. Upon these timbers I rest the anti-theft trap mechanism or spiller cover 48 about which my invention centers. This spiller cover 48 comprises in general a rectangular metallic frame which may be formed preferably of front member 49, rear member 50 and side members 51 and 52, as well as intermediate members 53, 54 and 55 disposed in substantially equal spaced relation to side members 51 and 52. While three such intermediate members are indicated, more or less may be used if desired. Also there are, for example, three cross members 56, 57 and 58 located between members 49 and 50. These various members are preferably of a tubular construction, but it should be understood that other forms of structural units may be employed. These various members may be securely held together by welding. The spiller cover thus constructed may be styled, in general, as a grilled cover.

Extension members 59 and 60 are each welded at one end to rear member 50 and are welded at their other end to shaft member 61. Adjustably secured to members 50 and 61 are counterweight supporting members 62 and 63. The adjusting members comprise U-bolts and plates 64, 65, 66 and 67. These are preferably diagonally placed across the intersection of the members 62 and 63 with shaft 61 and rear member 50. Counterweight supporting members 62 and 63 are adjusted lengthwise for each particular trap installation until the counterweight provides a proper balance for the weight of the spiller cover 48. At the end of members 62 and 63 are hung links 68 from each member, and to the bottom of each of these links is suspended counterweights 69 and 70.

The construction of shaft 61 includes a flexible means which may consist of two flexible joints 71 and 72 preferably disposed some twelve to eighteen inches apart. These flexible joints are necessitated by reason of the weaving of the impounding net supporting frame hereinabove described. The particular construction and location of these joints was found to solve the problem presented by the particular character of weaving of the supporting frame. While a single universal joint at one point of the shaft may work after a fashion, nevertheless the particular construction here comprising two flexible joints in spaced relation to each other solves the problem successfully. In one end of the tubular shaft 61 a solid shaft 73 of lesser diameter than the internal diameter of shaft 61 is inserted having slot 74 through which bolt 75 is secured in the end portion of tubular shaft 61. The slot 74 is at least twice the length of the diameter of the bolt 75 which provides for not only the rotation of shaft 73 about bolt 75 but also provides for endwise movement. The shaft 73 may be twelve to eighteen inches long in order to preferably provide a spaced relationship for the flexible joints 71 and 72. At the other end of shaft 73 is a forked member 76 carrying bolt 77. This bolt extends through a slot 78 in extension 79 carried by shaft 80. Slot 78 like slot 74 is larger than the bolt 77 to provide for endwise movement, and the width of extension 79 is of a narrower width than the opening between the forks of member 76. These clearances likewise assist in providing for endwise movement, and the loose fitting of shaft members 73 and flexible joints 71 and 72 also provide for overcoming the particular weaving problem arising from the weaving action of the impounding net supporting frame—logs 23, 24, 25 and 29. The shaft 80 has gear 81 meshing with worm 82 on shaft 83, which is provided with ball bearing thrust members 84 and 85, carried in bearings 86 and 87. Shaft 83 has a head 88 having longitudinally directed pin openings 89 which register with pins 90 carried by head 91 of crank means 92. The gear box 93 has a cover 94 to close access to the head 88. The cover 94 operating after the manner of a hasp engages staple-like member 95 in its forward edge portion. Thus provision is made for the inserting of a padlock 95a to hold the cover 94 in place in preventing the inserting of the crank 92 by an unauthorized party. A worm gear 82 with a crank means 92 provides means for actuating the shaft 61 in elevating the spiller cover 48 with its counterweight by agents of the trap owner, that is, the crank 92 is not left with the watchman. One or more reinforcing truss means 96 is operatively secured to the members of the spiller cover 48 in order to reinforce the same. Any suitable mounting means may be employed in mounting the shaft 61 of the spiller cover 48 to the log or frame member 24. However, I preferably employ the means set forth in Fig. 10, which is as follows:

A short piece of channel iron 136 may be inserted in a second channel member 137 extending at right angles thereto. These two members may be welded together. Drift or lag bolts 138 may be employed to secure the members 136 and 137 to the frame member 24. The lower portions of the flanges 114 of channel member 137 are removed and the web portion thereof 115 bent backward to conform with log 24. To the rear side of member 137 may be secured a third channel member 139. A series of holes 140 are located in the web portion 115 of member 137 through which holes bolts 141 are caused to extend as well as through holes in the web of member 139 in order that member 139 may be vertically, adjustably disposed with respect to member 137 to take care of any discrepancies in difference of elevation of one side of the spiller as respects the other. Upon the top of channel 139 is fixedly secured a bearing 142 through which shaft 61 is passed and in which shaft 61 revolves.

The worm 82 operates as a locking means to hold the spiller cover 48 in position together with other locking means to be hereinafter set forth.

One of the features of any mechanism to carry out the purpose of my invention, must be that it must not encumber the authorized agents of the owner in operating the trap. Speed, convenience, and ease of operation are primary requisites, even in a rolling sea. Accordingly, the special crank means 92 with the pins 90 carried by its head 91 as described above is adapted to register and fit the particular said worm shaft head 88, and together with said worm shaft head with its longitudinally directed pin openings 89, constitute a form of lock means in and of itself as it requires a particular crank head with specially disposed pins to register and fit the particular worm shaft head. In addition, the worm 82 likewise forms an additional locking mechanism as it requires the use of the crank 92 to cause it to revolve. Thus, the special combination of locking means as set forth is particularly adapted for operation even when subject to conditions of weaving due to constant wave action and heavy rolling seas incident to a storm. This is preferably supplemented with the special padlock mechanism now to be described. A special lock 104, see Fig. 8, is provided for securing the front end of the spiller cover 48 to the impounding net supporting frame, as for example, to log 23.

The weaving of such frame presents a problem in providing suitable padlock locking mechanism which may be insured against being broken by the sea. It is to be remembered at all times herein a fundamental purpose of my invention is to provide such a construction as will unmistakably indicate unauthorized tampering if there is any breaking or destruction of the equipment. Special pains are taken in my invention to avoid any breaking which might result from action of the sea. Accordingly, a special locking mechanism is provided. A bar 97 is pivotally mounted on bolt 98 to frame member 23. This bar 97 has a rather extended slot 99 therein. On the tubular frame member 49 of the spiller cover 48 is clamped band 100 which carries a bolt 101 on which bolt is pivotally mounted a bar 102, which has an extended slot 103 therein. Thus the bar 102 is pivotally mounted to swinging horizontally on its pivot mounting bolt 101, and bar 97 is free to oscillate in a vertical plane and at right angles to movement of bar 102. The said slots 99 and 103 are purposely of larger size than actually necessary by the thickness of the bars, and so permit of loose fitting which together with the movement permitted by the cooperating members takes care of the weaving of the supporting frame. The padlock 104 is passed through the slot 99 and thereby prevents the bar 102 from being raised as first would be necessary to permit the elevating of the spiller cover 48.

A very important part of my invention is the following:

A depending projecting bracket is preferably provided by the following construction (Figs. 1, 2, 3 and 7): This bracket 105 is preferably formed of a U-shaped member 106 having its ends secured by clamps 106a and 106b preferably to bars 53 and 55 of cover 48, and also a stiffening member 107 is swingingly mounted by clamps 107a and 108a at the central portion 108 of the U-member 106. This stiffening member 107 extends backwardly and may be secured to member 54. A second projecting bracket 109 (for rear mounting of cover 48) of identical construction to that just described having corresponding members 110, 111 and 112 may be mounted by clamps 110a, 110b, and 111a and 111b on the same bars only near the rear end of the spiller cover. These project into the water ordinarily some eight feet so that the impounding hemp net 43 cannot be raised above the bottom of these bracket members 105 and 109. This operates to maintain the fish at all times swimming in a body of water of sufficient depth to provide the fish with free swimming movement and therefore are not confined, which confinement is a condition necessary for them to be netted for removal. These brackets 105 and 109 extend down into a portion of the water in the impounding net that is adjacent to the bottom portion of the impounding net where the fish normally swim about. This arrangement operates to block the operation of a fish removing mechanism commonly referred to by the cannerymen as a "Swift Water," a description of which will be hereinafter set forth. Let it be emphasized that these depending projecting brackets constitute an important feature of my invention. The bolts 106c and 107c (Fig. 7) may be welded or up-set as all other fastening herein so that they cannot be removed by unauthorized agents without traces of human tampering. At any rate, it would require considerable time for their removal and it is to be noted that time is a very important element in the operating of a fish pirate. To make his escape he must be able to get the fish quickly and be on his way. Any such delay in his operation will make him hesitate to attempt a robbery of a fish spiller equipped with my invention.

In Fig. 9 a modified form of my invention is illustrated. In this instance, there are no counterweights provided. The spiller cover 129 in this instance comprises a grilled frame of similar construction to the preferred form as hereinabove set forth so far as the rectangular frame members are concerned. Preferably the frame will have depending projecting brackets 132 and 133, which may be of an identical construction to that already described above. A wire meshed netting 113 may be disposed over the grilled frame of the spiller cover 129 if desired, such grilled netting being optional also in the case of the preferred form in spiller cover 48.

A mast 123 may be fixedly mounted adjacent timber frame 24 about centrally of the spiller. On this mast may be slidingly mounted a sleeve 124 engaged by cable 125 passing over sheave 126 to drum 127 which may be operated by a gear and worm and crank 128 mechanism as hereinabove described. The crank 128 is removable as is crank 92 so it is not available for use by unauthorized agents. The gear case having drum 127 and its associated worm and gear may be preferably provided with a padlocking cover (not shown), similar to cover 94, to prevent access with an unauthorized crank. Spiller cover 129 may be mounted upon sleeve 124 by bracket 130 and truss member 131. By means of the drum 127, the cable 125 and the sleeve 124, the spiller cover 129 may be raised to elevate it to such a position as shown in Fig. 9 to have the brackets 132 and 133 clear the framework, including the timbers 46 and 47. The cover 129 is then swung around on the mast 123 (the sleeve 124 merely revolving on the mast 123) so that the cover 129 is removed from obstructing the opening of the spiller.

Instead of a bracket construction of the design hereinabove described having a three-point mounting on the bars of the spiller cover, a modified form of such projecting means may be as shown in Fig. 11 comprising a projecting member 134 preferably provided with a ring 135 which prevents the net becoming entangled therewith during high seas. A plurality of these depending members may be located across the front and across the rear of the spiller cover 48, or elsewhere as may be desired, so that the net cannot be raised in the act of attempting to confine the fish to a degree which is necessary for dip netting or the use of a "Swift Water." These members may be welded to the bars 53 and 55 so that they may be removed by the lifting of the spiller cover 48 with its intermediate members 53, 54 and 55 by authorized agents unlocking the cover. However such removal could not readily be done without the key to the lock during the short time available for a pirate to render said members inoperative. It is apparent that the lock could not be removed without leaving evidence of tampering, such tampering being readily distinguishable from breakage by the sea. A bar 135a may be secured in the ring members 135 if desired which will serve to hold the net down at points intermediate the rings 135 of the projecting members 134 and also tend to make inconvenient the rotation of the members 134 on their mountings. It will be understood that all bolts having nuts thereon are either upset or welded so as to prevent their ready removal by unauthorized agents, and any tampering therewith will leave positive evidence of human agents' action in connection therewith.

A modified form of projection means is shown in Figs. 12 and 13. A single iron bar or rod means 143, preferably of bow form, is mounted on logs 25 and 29. The mounting means is shown in Fig. 13. This preferably comprises a channel member 144 having bolts 145 extending through the web of the channel member 144 into the log 25. The flanges of channel member 144 are preferably provided with upstanding wings 146 at the lower end thereof, and said flanges may be provided with slots 147 through which a bolt 148 may pass as well as through a hole 149 in bar 143. The opposite end of bar 143 may be mounted upon log 29 precisely in the same manner as the same is mounted upon log 25. A slot 150 is provided in the bolt 148 through which a padlock may be secured as well as an ordinary sealing strap hereinabove referred to. A hole 151 may also be provided in member 143 through which a line 152 may be secured for moving the bar 143 when disconnected from its mounting means and secured to one side of the spiller when the authorized agent comes to brail out the fish. This projecting means operates in general in the same manner as projecting means 105, 132 and 134 as hereinbefore described, that is, it keeps the bottom of the impounding net sufficiently in deep water so that the fish cannot be confined for dip netting or for use of the "Swift Water." These projecting means also operate as obstructions as hereinabove described. In this modified form, however, there may be no spiller cover.

In removing fish from the spiller, brailing is the ordinary method used by the cannery tender of the trap owner, which tender collects the fish from the various traps and takes them to the cannery. If the spiller impounding net 43 is of hemp construction rather than wire, ordinarily the bottom of the net is raised towards the top by pulling up its walls. After the impounding net 43 is raised so that the fish become somewhat confined, a brailing net, which has one end portion secured to the gunwale of the ship or tender into which the fish are to be loaded, is lowered into the spiller as to its other weighted end. This unsecured end to which is fastened a metal bar to serve as a weight is lowered along the front wall of the spiller; that is, along frame member 23.

The brailing net comprises a sheet of netting about 12 feet by 20 feet with the edge of one end secured to said ship and with a weight in the form of a bar along the edge of the other end. A tackle bridle is mounted on the weighted bar end of the net with the bridle secured to a boom and tackle elevating means of the ship. Other ropes manually operated are secured to each end of the bar weight. The weighted end of the brailer is dropped into the spiller along the wall closest to the ship. This weighted end is then drawn away from the ship by the manually operated ropes until the brailing net is beneath a body of fish. Then the hoisting tackle of the ship elevates the weighted end of the brailing net vertically, thereby spilling the fish into the hold of the ship.

In the case of the impounding net being constructed of hemp or manilla net material, the net is raised to confine the fish and the brailer disposed beneath the fish to lift them into the hold of the ship as above set forth. In the case of a wire impounding net in the place of a hemp or manila spiller net, the wire net is not lifted in the step of elevating the fish to a confining area. In this case the device known as a "Swift Water" is employed as a means to confine the fish in place of raising the bottom of the net. The "Swift Water" comprises a sheet of netting of larger size than the ordinary brailing net. It is ordinarily about fifty feet long by thirty feet wide. Along the edge portion of one of the long sides lead weights, as used in seining, are attached. Also, ropes are attached to the corners of the device. The weighted edge portion is let down in the water of the spiller along the rear wall and then by means of the ropes this lower edge is pulled along the bottom of the spiller towards the front wall. In the meantime, the side opposite the leaded side is held by means of the ropes just above the surface of the water. When the leaded side reaches the front wall of the spiller it is raised by means of the ropes attached to the corners and raised towards the surface of the water in the spiller, and the net is continued to be raised until the fish are confined. The extent of the raising depends of course upon the quantity of fish in the net. Next, a brailer as described above may be employed. In place of the brailer, sometimes a dip net is employed. This dip net consists of an iron hoop some thirty inches in diameter and is mounted on a long wooden handle. To the iron hoop a relatively long converging net is employed, some four feet long, having iron rings at the bottom and a chain (acting as a purse string) extending through the iron rings so that the bottom of the net may be drawn tight by means of a rope attached to one end of the chain. A bridle is attached to the iron ring and this in turn connected to ship hoisting tackle. The operator by means of the long handle presses the iron hoop through the fish confined in the "Swift Water" and dips some two or three hundred pounds of fish at a time while the rope attached to the purse string is kept taut. Then the ship hoist lifts the dip net with its some two hundred or more pounds of fish aboard the ship, and the rope controlling the purse string is loosened and the fish drop out of the bottom of the dip net into the hold of the ship. For general illustration of a fish trap having "spillers," see patent to William C. Beckman, #1,556,401, issued October 6, 1925, which shows in general a fish trap having "lead" 10 with the "heart" construction 11 and the fish "pot" 14 and "spillers" 15 with "tunnel" from the "pot" 16 for restricted entrance for the fish.

The mode of operation

Now having seen how the fish are normally removed from the spillers, the mode of operation of my invention in blocking the operation of fish pirates will be more readily understood. The mode of operation of many of the parts of my invention has already been set forth in large measure above.

By providing bars 59 and 60 with extensions across the log 24 so that the shaft 61 may be located rearwardly of log 24, provision is made for the use of log 24 in walking thereon in the care and operation of the trap as its top surface is free of superimposed equipment.

It must be emphasized that it is not the purpose of my invention to provide a positive unbreakable barrier against the fish robber or pirate. Any protecting means must not unduly interfere with the convenient and ready operation by the authorized tender of the trap owner. The importance of this will be understood when it is known that ofttimes a heavy sea may be rolling when fish are being removed from the trap. Therefore, speed of action and ready access are important. However, the constant weaving and wearing due to the sea operates to cause breaks that would not be chargeable to any human agency. Accordingly, the device which I have invented operates to the end of providing positive evidence in case the fish trap is molested by unauthorized agents, acts of molestation that could not be attributed to the acts of the sea, and thereby putting the burden of proof on the watchman to identify the parties and the character of the ship that was employed in such piracy. That is, the fundamental purpose of my invention is to provide positive evidence of trespass.

In describing the mode of removal of the fish from the impounding spiller, it has been set forth above that it was first necessary to confine the fish both in the case of the hemp net spiller and in the case of the wire net spiller.

It is clear that the projections 105 and 109 and the modified forms thereof will prevent the bottom of the impounding net, if made of hemp, being elevated to a height that will permit the fish to be confined. In the case of the wire spiller net it will prevent the "Swift Water" being employed to confine the fish. The reason for this is as follows: If the "Swift Water" is let down into the spiller along the rear wall and its front side ropes passed beneath each of the bars 53, 54 and 55 of the cover 48, and the weighted side of the "Swift Water" is pulled forward by the ropes to the front side of the spiller net by passing the ropes beneath bars 58, 57 and 56, and then raised, it will be necessary when the rear side is brought forward towards the front in order to get under the projection of the bracket 105 to let the rear side of the "Swift Water" down beneath the projecting means 105. Immediately, when such rear side of the "Swift Water" is lowered to a depth beneath said projecting means, the fish will dash over the top and will be free by escaping to the part of the spiller behind the rear side of the "Swift Water." Also, in the meantime, during any such attempted maneuvering, great delay is resulting, and the risk of being seen by others would operate as a deterring factor.

If the fish pirate attempts to hacksaw off one of the bars 97 or 102 which holds the padlock 104, the weaving of the impounding net supporting frame is such to make such operation exceedingly difficult, because the tension and strain put on these bars would pinch the hacksaw and prevent its proper functioning. If an acetylene burner was attempted to be used, the flash of this bright light would be readily recognized for a long distance. In any event, either the molestation of the device by hacksawing or by acetylene burning, or removal of the padlock would give positive proof that the trap has been molested in an unauthorized manner. If the padlock 104 or the bar 97 or the bar 102 is removed, nevertheless the spiller cover 48 is not elevatable to lift the projecting means so that the fish may be removed, because an attempt to lift the front edge of the spiller cover 48 would be locked against elevation by means of the worm 82 and gear 81. There would have to be a positive breaking of the worm 82 or gear 81 in order to so elevate the spiller cover 48. This, of course, would be positive evidence of molestation in an unauthorized manner, or evidence of trespass in its ordinary meaning.

When the cannery tender of the authorized agent or cannery comes to the trap to remove the fish, such tender would make fast to the front log 23. The captain of the tender would cause the unlocking of the padlock 104 (Fig. 8) so that the cover 48 would be free to be lifted, and then he would cause the removal of the padlock on the cover 94 (Fig. 4) of the gear box 93. Next, the skipper would cause the special crank 92 (Fig. 4), which he carries on the ship, with its particular pin arrangement 90 to be applied to actuate worm 82 and thereby gear 81 and thereby shaft 80 to elevate the spiller cover 48 into elevated position as shown in dotted line (Fig. 3). Then he would proceed to remove the fish with the regular brailing equipment. When he has done this he would cause the worm 82 and associated mechanism to be actuated to lower the spiller cover 48 into locking position, as shown in Figs. 2 and 3. These locks can be changed as frequently and of course without notice as may be desired.

If the fish pirate comes to the trap to remove impounded fish from the spiller, he, of course, would do this in conspiracy with the watchman who is supposed to be guarding the trap. For him to get at the fish it is manifest he must remove the cover in order to get the projecting means 105 and 109 out of the way, or if it has no projecting means, he must remove the cover which in such case would preferably have a screen 113 thereover. This screen may be welded in position so that any tampering therewith would be quickly detectable, and such a cover would be provided with a frame weaving absorbing mechanism as shown in Fig. 8. Any molestation of the locking mechanism or of the screen member 113 would immediately leave evidence of such unauthorized interference with the impounded fish and the watchman would be called to account. The locking mechanism shown in Fig. 8 clearly acts as a universal joint to absorb the weaving of the impounding net supporting frame, and the grill work of the cover would operate to interfere with the operation of the "Swift Water" and the dip net and introduce such a delay in operation that discovery is much more likely to occur. Accordingly, a fish trap pirate would hesitate to attempt to take fish from a trap so equipped.

The cover 48 with its associated projecting means weighs approximately eighteen hundred or more pounds, and being some thirty feet by twenty-six feet in size constitutes a very unwieldy structure to be operated in rough sea weather. The projecting means 105 and 109 also operate to make the device unwieldy in handling. My invention overcomes the difficulty and obstacles in handling the unwieldy structure. One problem which the invention had to meet was a suitable means of providing for the removal of this cover and its associated mechanism manually, and to do this while the sea may be rolling very heavily. This all had to be done speedily and without delay when the authorized operator came to brail the fish. Also, such manually operating means had to be of a character that would insure against damage to the device or injury to the operators.

The mode of operation of the modified form shown in Fig. 9 so far as preventing the operation of the "Swift Water" and the fish dip net by the pirates are concerned, is substantially similar to that described above for the preferred form for the application of the invention. There would have to be a removal or breaking of the locks to permit the removal of the spiller cover 48 and there would have to be a suitable crank prepared to operate the hoisting mechanism. In addition, there would have to be a removal of the padlock for cover 94 of gear box 93 which may be further employed in connection with locking the gear box so that access by any type of crank would not be permitted. The keys, of course, to these different padlocks would be carried only by the authorized agent of the fish tender of the true owner, which keys and locks may be changed without notice and therefore further complicate the success of any plans for fish piracy. The fishing period only extends over a period of some thirty to thirty-five days, and the daylight is so extensive in the latitude of Alaska that there are only a few hours each night for such piracy operation under the cover of darkness. Accordingly, the attempt to make the necessary income by piracy, and taking into account the amount of outlay that would be involved and the danger of capture, makes any such procedure exceedingly risky. The continual change of padlocks provides protection against the rare situation where the skipper of the fish tender of the true owner of the trap may attempt to join with the watchman and pirates in their illegal enterprise, or even against patrolmen who may join in the conspiracy. These locks may be changed by special confidential employees of the company who have otherwise altogether too much at stake to be involved in any such questionable undertakings.

Obviously, changes may be made in the forms, dimensions, and arrangement of the parts of my invention without departing from the principle thereof, the above setting forth only preferred forms of embodiment.

I claim:

1. A theft-of-salmon-hindering salmon trap comprising a water surface floating fish trap impounding net supporting frame adapted to be positioned at the end of a single fixed lead from shore; a spiller including a net suspendedly secured to said frame; and depending bar means removably mounted on said frame and extending downwardly into the water within the confines of said spiller and extending laterally across at least a portion of the area thereof and downwardly a substantial portion of the height of the spiller to an extent which is adapted to maintain fish in the net to a depth of water which affords the impounded fish a free space in which to swim and to leap above the water surface in eluding unauthorized capture if a net be dipped into the spiller to the depth of said bar means.

2. The method of hindering the unauthorized removal of fish from an open top spiller compartment of a water surface floating fish trap having an impounding net supporting frame capable of weaving in response to the ocean waves, said spiller being suspendedly secured to said frame, comprising impounding fish within said spiller, said fish until then being free to move in their wild natural state; and impeding unauthorized removal of the fish from said spiller by locating obstructions in the upper depth of water within said spiller against fish capturing operations and maintaining a depth of water extending to the bottom of said obstructions, in which depth of water said fish are free to swim and to leap above the water surface in eluding unauthorized capture.

3. A theft-of-salmon-hindering salmon trap mechanism comprising a water surface floating fish trap impounding net supporting frame adapted to be located at the end portion of a single fixed lead from shore; a spiller suspendedly secured to said frame; a removable open spiller cover disposed above the water surface of the water enclosed by said spiller, which cover is formed of spaced apart bars disposed in spaced relation on said cover to minimize heavy shadow casting on the water surface; and depending bar members suspendedly secured to the under side of said spiller cover extending downwardly into the water a substantial portion of the height of the spiller to an extent which is adapted to maintain the fish in a depth of water which affords the impounded fish a free space in which to swim and to leap above the water surface in attempting to elude capture by netting.

4. The method of confining trapped fish in an open top spiller compartment of a water surface floating fish trap having an impounding net supporting frame capable of weaving in response to the ocean waves, said spiller including a net being suspendedly secured to said frame, comprising the impounding of fish within said spiller, said fish until then being free to move in their wild natural state; maintaining said fish within the water bounded by said spiller wherein the fish are free to swim to the water surface thereof, escape of said fish being prevented from the bottom or sides by said net; and retarding removal of said fish in a vertical direction above a predetermined level of the bounded water in which the confined fish are free to swim and to leap above the water surface in attempting to elude unauthorized capture.

5. The method of hindering the unauthorized removal of fish from the open top spiller of a water surface floating fish trap having an impounding net floating supporting frame, said spiller being suspendedly secured to said frame and having a net depending downwardly therefrom to a depth in the order of twenty feet, said method comprising the impounding of fish within said net of the spiller, introducing a member into the water within the net to form an obstruction therein so as to define an upper and a lower zone, thereby impeding the unauthorized lifting of the bottom of the net from the lower zone into the upper zone and also impeding the unauthorized lowering of means for effecting removal of fish from the upper and the lower zone and thus interfering with vertical removal of the fish and allowing the fish to be free to swim and to leap above the water surface in attempting to elude unauthorized capture.

6. A theft-of-salmon-hindering salmon trap mechanism comprising a water surface floating spiller net supporting frame adapted to be located at the end portion of a single fixed lead from shore; a spiller of bag-like form suspendedly secured to said floating frame; a removable cover for said spiller including a bar frame with spaced apart intermediate bars; and a depending bar structure secured to said cover and adapted to extend downwardly into the water bounded by said spiller a substantial portion of the height of said spiller to form an obstruction therein to a net lifting operation.

7. A theft-of-salmon-hindering salmon trap mechanism comprising a water surface floating spiller net supporting frame adapted to be located at the end portion of a single fixed lead from shore, said frame being formed of a plurality of links secured together; a bag-like spiller suspended from said floating frame and depending downwardly to a depth in the order of twenty feet; and a spiller cover formed of spaced apart metal bars mounted on said supporting frame; means for securing said cover in closed position to said frame while permitting the cover to oscillate in a vertical plane at right angles to the lateral movement of said frame, and bars depending from the cover a substantial distance below the cover within the spiller.

8. In a theft-of-salmon-hindering fish trap mechanism the combination of a water surface floating impounding net supporting frame adapted to be located at the end portion of a single lead from shore; an open top spiller formed of a net suspendedly secured to said frame, said spiller adapted to enclose a square water surface area of the order of 30 feet on each side thereof and of the order of 20 feet deep; a removable spiller cover of a size substantially extending over the area bounded by the top portions of said spiller net, mechanical means for operating the cover; and an anti-fish-netting depending bar structure mounted on said bars of said cover and extending downwardly into the water of said spiller net a substantial portion of the height of said spiller to provide an obstruction against fish netting operations.

References Cited in the file of this patent

UNITED STATES PATENTS

| Number | Name | Date |
|---|---|---|
| 101,983 | Cornell | Apr. 19, 1870 |
| 119,457 | Gathman | Oct. 3, 1871 |
| 170,697 | Anderson | Dec. 7, 1875 |
| 213,579 | Law | Mar. 25, 1879 |
| 386,591 | Kile | July 24, 1888 |
| 559,478 | Bunting | May 5, 1896 |
| 657,460 | Sharpless | Sept. 4, 1900 |
| 693,391 | Holland | Feb. 18, 1902 |
| 739,301 | Fountain | Sept. 22, 1903 |
| 1,183,878 | Horovicz et al. | May 23, 1916 |
| 1,209,550 | Buckwalter | Dec. 19, 1916 |
| 1,464,623 | Lybeck | Aug. 14, 1923 |
| 1,556,401 | Beckmann | Oct. 6, 1925 |
| 1,661,336 | Katz | Mar. 6, 1928 |
| 1,710,569 | Castorina | Apr. 23, 1929 |
| 1,980,452 | Tice et al. | Nov. 13, 1934 |
| 2,162,623 | Livingston | June 13, 1939 |
| 2,254,150 | Kingsland | Aug. 26, 1941 |

FOREIGN PATENTS

| Number | Country | Date |
|---|---|---|
| 7,891 | Great Britain | 1907 |
| 53,726 | Norway | Jan. 24, 1933 |